US007883328B2

(12) United States Patent
Lin

(10) Patent No.: US 7,883,328 B2
(45) Date of Patent: Feb. 8, 2011

(54) EXTRUSION APPARATUS FOR SPIRAL STRIPPING ELECTRICAL WIRE

(75) Inventor: Chih-Hsiang Lin, Shin Juang (TW)

(73) Assignee: Lorom Industrial Co., Ltd., Taipei (TW)

( * ) Notice: Subject to any disclaimer, the term of this patent is extended or adjusted under 35 U.S.C. 154(b) by 502 days.

(21) Appl. No.: 11/825,813

(22) Filed: Jul. 9, 2007

(65) Prior Publication Data

US 2009/0014200 A1 Jan. 15, 2009

(51) Int. Cl.
B29C 47/04 (2006.01)
B29C 47/24 (2006.01)

(52) U.S. Cl. .................... 425/113; 425/133.1; 425/191; 425/379.1; 425/381; 425/382.3; 425/462; 425/466

(58) Field of Classification Search ................ 425/113, 425/133.1, 191, 379.1, 381, 382.3, 462, 466
See application file for complete search history.

(56) References Cited

U.S. PATENT DOCUMENTS 2,138,378 A * 11/1938 Johnson ................. 264/173.11
2,610,607 A * 9/1952 Isenberg ..................... 118/412
3,473,986 A * 10/1969 Hureau ........................ 156/51
2005/0258565 A1* 11/2005 Anand ........................ 264/167
2005/0260408 A1* 11/2005 Anand et al. ................ 428/364

* cited by examiner

Primary Examiner—Yogendra N Gupta
Assistant Examiner—Joseph Leyson
(74) Attorney, Agent, or Firm—Pro-Techtor Int'l Services; Ralph Willgohs

(57) ABSTRACT

An extrusion device for making spiral stripping electrical wires is disclosed to include a fixed mold member, which has a main flow path and a supplementary flow path for the passing of a first insulative material and a second insulative material, and a rotating mold member, which is rotatably supported on the front end of the fixed mold, having a mold hole axially connected to the outlet of the main flow path and one or multiple flow paths, each flow path of the rotating mold member having an outlet in communication with the mold hole and a common annular inlet disposed in communication with the outlet of the supplementary flow path for guiding the second plastic material spirally into the first plastic material to form a spiral strip in the insulator during extrusion of the two plastic materials with a conductor through the mold hole.

9 Claims, 4 Drawing Sheets

EXTRUSION APPARATUS FOR SPIRAL STRIPPING ELECTRICAL WIRE

BACKGROUND OF THE INVENTION

1. Field of the Invention

The present invention relates to stripping electrical wires and more particularly, to a spiral stripping electrical wire. The invention relates also to the fabrication of the spiral stripping electrical wire.

2. Description of the Related Art

The outer insulative material of an electric wire or cable is formed by means of extrusion coating. During extrusion, the conductor is extruded with the polymer out of the hole of the die at the same time.

The insulator of an electric wire or cable is made in one single color. There are some electric wires and cables that the insulator extruded from two different colors of plastics. The double color design is for easy identification. Further, the double color design also adds to beauty, thus enhancing market competivity.

FIG. 1 is a sectional view of a conventional double color electric wire extrusion device. According to this design, the extrusion device 80 comprises a main flow passage 81 and an auxiliary flow passage 82. During extrusion, the screw rod (not shown) squeezes a first insulative material 92 in the main flow passage 81 axially forwards (along the electric wire extruding direction), and simultaneously squeezes a second insulative material 93 in the second flow passage 83 perpendicularly into the first insulative material 92 in the main flow passage 81, enabling the first insulative material 92 and the second insulative material 93 to be extruded with a conductor 94 out of a die hole 83 to form an electric wire 90 having an insulative coating layer 91. FIG. 2 illustrates the outer appearance of an electric wire 90 made by means of the aforesaid extrusion device 80.

In the aforesaid extrusion device 80, the second insulative material 93 is squeezed into the first insulative material 92 from a fixed point, therefore the second insulative material 93 forms a strip in the first insulative material 92. The strip of the second insulative material 93 provides the insulator of the finished electric wire a second color for identification. To have a breakthrough in visual effect in a double color electric wire, a wire twister may be used to twist a double color electric wire spirally, changing the straight strip into a spiral strip. However, because the electric wire is flexible, it will return from the spirally deformed shape to its former straight strip shape or become not apparent in twisted shape when the external force is disappeared. For once and for all, it is not the cleaver way to change a double color electric wire into a spiral stripping design by twisting.

SUMMARY OF THE INVENTION

The present invention has been accomplished under the circumstances in view.

It is one object of the present invention to provide a spiral stripping electrical wire, which has its insulator extruded from a first color insulative material and a second color insulative material spirally extending in the first color insulative material.

It is another object of the present invention to provide an extrusion device for making a spiral stripping electrical wire, which has its insulator extruded from a first color insulative material and a second color insulative material spirally extending in the first color insulative material.

According to one aspect of the prevent invention, the extrusion device comprises a fixed mold member, and a rotating mold member. The fixed mold member comprises a main flow path and a supplementary flow path for the passing of a first insulative material and a second insulative material respectively. The rotating mold member is rotatably supported on the front end of the fixed mold, having a mold hole axially connected to the outlet of the main flow path and at least one flow path. Each flow path of the rotating mold member has an outlet in communication with the mold hole and an annular inlet disposed in communication with the outlet of the supplementary flow path. Therefore, each flow path of the rotating mold member guides the second plastic material spirally into the first plastic material to form a respective spiral strip in the insulator during extrusion of the two plastic materials with a conductor through the mold hole.

According to another aspect of the present invention, when the rotating mold member is made having more than two flow paths, and the multiple flow paths of the rotating mold member have a common annular inlet.

According to still another aspect of the present invention, a transmission mechanism is provided and controlled to rotate the rotating mold member. The transmission mechanism comprises a speed changer controllable to change the rotating speed of the rotating mold member, so as to further control the pitch of the spiral strip thus formed.

DETAILED DESCRIPTION OF THE PREFERRED EMBODIMENT

Figure 1:
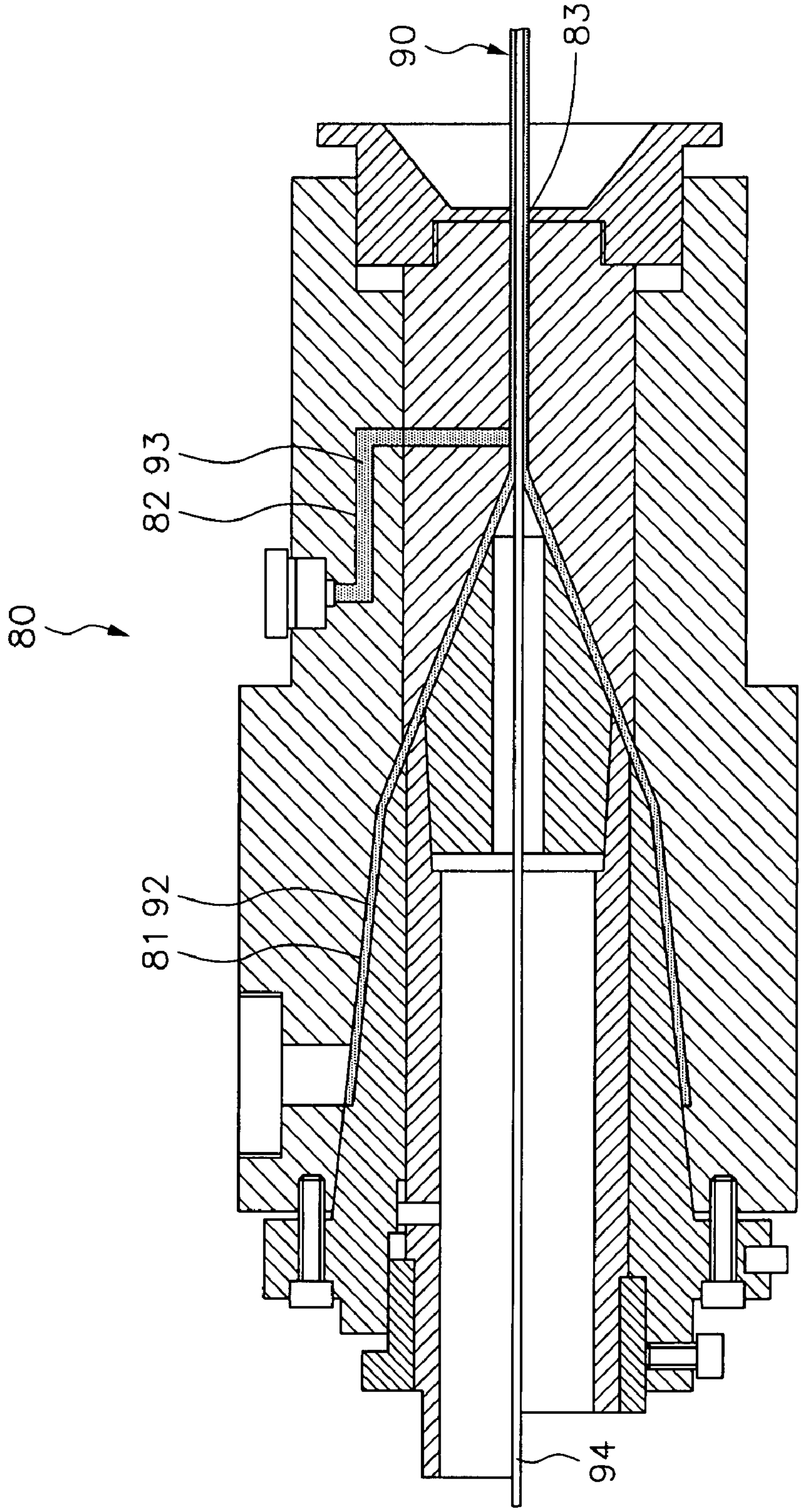
FIG. 1 (Prior Art)
FIG. 1 is a sectional view in axial direction of an extrusion device for making straight stripping electrical wires according to the prior art.
Figure 2:
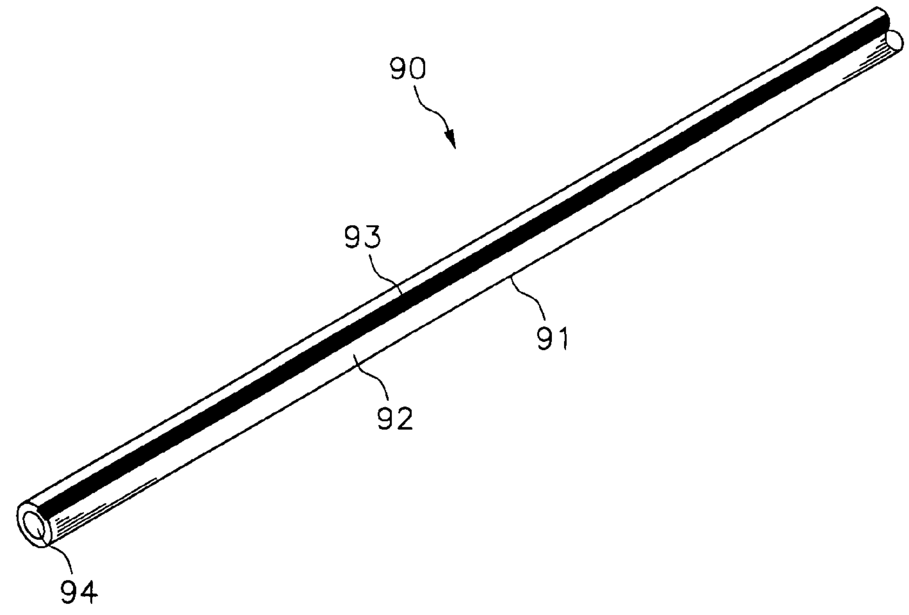
FIG. 2 (Prior Art)
FIG. 2 illustrates a straight stripping electrical wire made by the extrusion device shown in FIG. 1.
Figure 4:
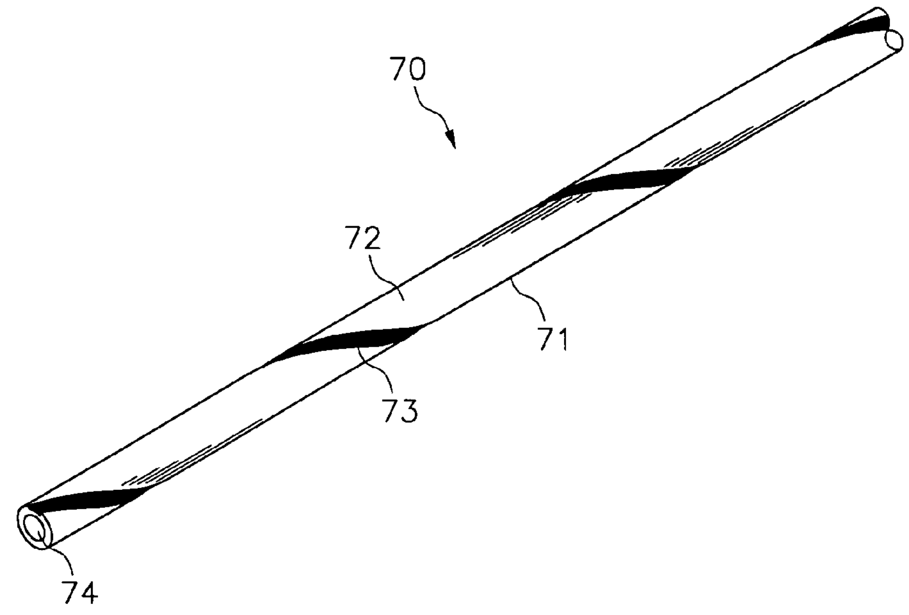
FIG. 4 illustrates a spiral stripping electrical wire made by the extrusion device shown in FIG. 3.
Figure 3:
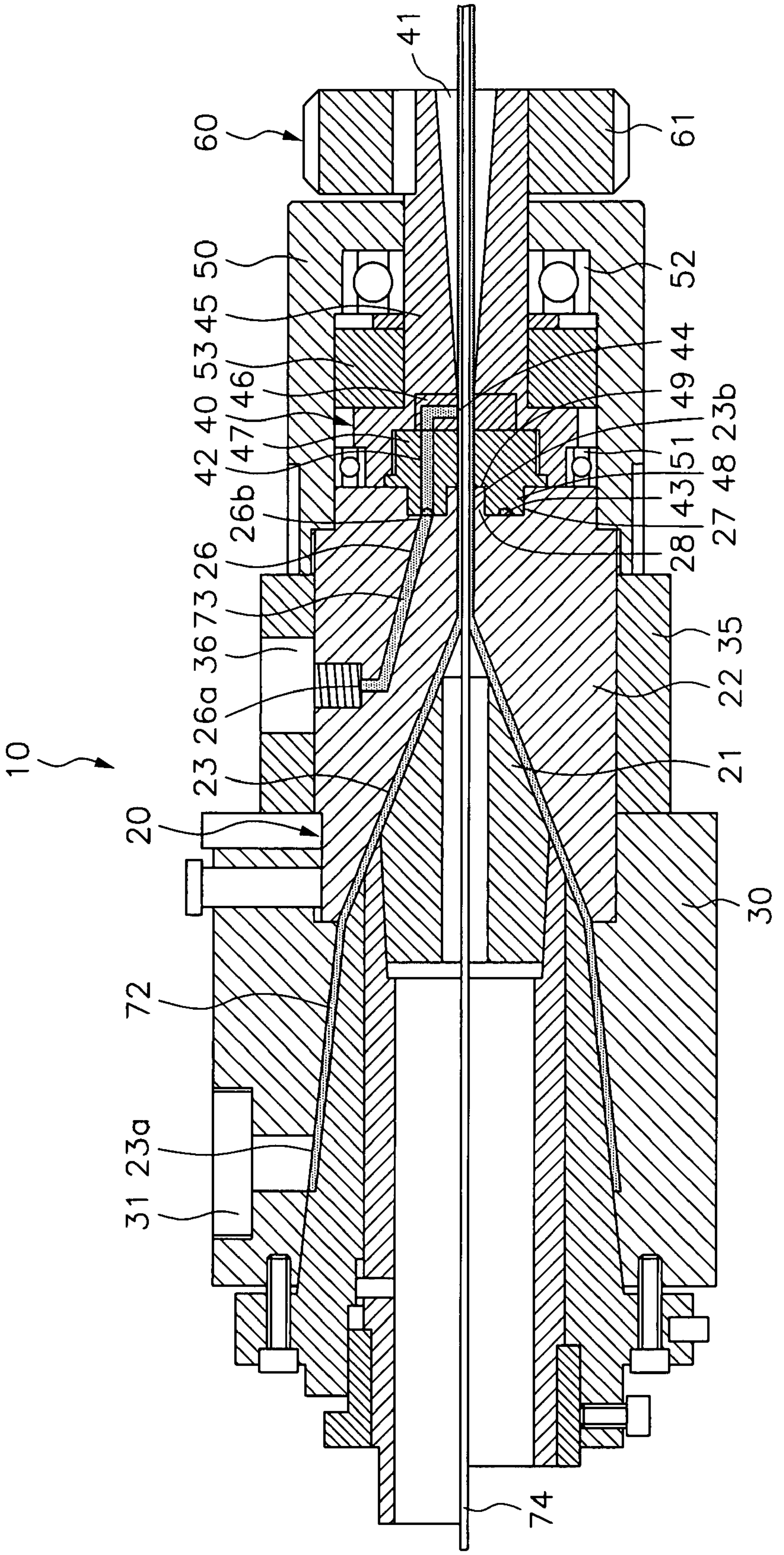
FIG. 3 is a sectional view in axial direction of an extrusion device for making spiral stripping electrical wires according to the present invention.

FIG. 3 is a sectional view in axial direction of an extrusion device 10 for making spiral stripping electrical wires according to the present invention. FIG. 4 illustrates a spiral stripping electrical wire 70 made by the extrusion device 10. The extrusion device 10 comprises a fixed mold member 20 supported on a machine head 30. The fixed mold member 20 is comprised of an inner mold element 21 and an outer mold element 22. The fixed mold member 20 defines a main flow path 23 between the outer surface of the inner mold element 21 and the inner surface of the outer mold element 22 for the passing of a first insulative material 72. The main flow path 23 has an inlet 23*a* in communication with the main filling hole 31 in the machine head 30, and an outlet 23*b*. The outer mold element 22 comprises a supplementary flow path 26 for the passing of a second insulative material 73. The supplementary flow path 26 has an inlet 26*a* and an outlet 26*b*. Further, a heating barrel 35 is sleeved onto the periphery of the outer mold element 22, having a supplementary filling hole 36. Grained or powdered first insulative material 72 and second insulative material 73 are respectively fed into the main filling hole 31 of the machine head 30 and the supplementary filling hole 36 of the heating barrel 35, and heated into a respective flow of plasticized viscous fluid. Under the effect of the pressure screw rod (not shown), the fluid of the first insulative material 72 and the fluid of the second insulative material 73 go through the main flow path 23 and the supplementary flow path 26. Further details in this regard will be described further.

Another important part of the present invention is the rotating mold member, referenced by 40. The rotating mold member 40 is rotatably supported inside a socket 50 at the front side of the fixed mold 20. The socket 50 is threaded onto the outer mold element 22, holding two axle bearings 51 and 52 and an intermediate member 53 between the axle bearings 51 and 52. The rotating mold member 40 comprises an elongated tapered mold hole 41 in axial alignment with the outlet 23*b* of the main flow path 23, and a flow path 42. The flow path 42 has an inlet 43 in communication with the outlet 26*b* of the supplementary flow path 26, and an outlet 44 in communication with the mold hole 41. The inlet 43 of the flow path 42 is an annular groove formed on the rear end of the rotating mold member 40 for communication with the outlet 26*b* of the supplementary flow path 26. During rotation of the rotating mold member 40, the inlet 43 is kept in communication with the outlet 26*b* of the supplementary flow path 26 constantly, for allowing the fluid of the second insulative material 73 to go from the supplementary flow path 26 through the inlet 43 into the flow path 42 and then to go from the outlet 44 into the mold hole 41 and to further merge in the axially flowing fluid of the first insulative material 72 for extrusion with the conductor, referenced by 74 through the mold hole 41 to form the desired spiral stripping electrical wire 70. Actually, the rotating mold member 40 is formed of three mold elements 45, 46, and 47. This three-component rotating mold design is to facilitate the fabrication. Alternatively, the rotating mold member 40 can be a single piece design or formed of two or more mold elements.

To keep optimal friction contact between the rear end edge of the rotating mold member 40 and the front end edge of the fixed mold member 20, the rotating mold member 40 preferably has an annular protrusion 48 at the rear side. The annular protrusion 48 defines therein a circular recess 49. The fixed mold 20 (more accurately, the outer mold element 22) has forwardly extending annular protrusion 28, which is inserted into the circular recess 49 of the rotating mold member 40, and an annular groove 27 formed on the front end around the annular protrusion 28 for receiving the annular protrusion 48.

The aforesaid conductor 74 can be a solid or tubular copper wire, a solid or tubular tinned copper wire, or a strand of fine copper wires. The insulative materials 72 and 73 are thermoplastic plastic materials, such as PE (polyethylene), PP (polypropylene), or the like.

The aforesaid socket 50 is equipped with an electric heater (not shown) adapted to heat the rotating mold member 40, keeping the first and second plastic materials 72 and 73 in the plasticized status, i.e., preventing hardening of the fluids of the first and second plastic materials 72 and 73 before extrusion.

Because the rotating mold member 40 is rotatable relative to the fixed mold 20, the fluid of the second insulative material 73 is forced into the axially flowing fluid of the first insulative material 73 during extrusion, thereby forming a spiral strip in the straight strip of the first insulative material 72. FIG. 4 illustrates a spiral stripping electrical wire 70 made by the extrusion device 10. The reference number 74 indicates the conductor. The reference number 71 indicates the insulator formed of the first insulative material 72 and the second insulative material 73.

The aforesaid rotating mold member 40 is driven by a transmission mechanism 60. The power output terminal 61 of the transmission mechanism 60 is coupled to the rotating mold member 40 so that the transmission mechanism 60 can rotate the rotating mold member 40. Preferably, the transmission mechanism 60 comprises a speed changer (not shown) controllable to change the rotating speed of the rotating mold member 40 and to further change the pitch of the spiral strip formed of the second insulative material 73. Simply speaking, when the speed of the rotating mold member 40 is increased, the pitch of the spiral strip is relatively reduced. On the contrary, the pitch of the spiral strip is relatively increased when the speed of the rotating mold member 40 is reduced. FIG. 3 only illustrates the power output terminal (gear) 61 of the transmission mechanism 60.

Because the rotating mold member 40 of the aforesaid extrusion device 10 has only one flow path 42, the second insulative material 73 forms a spiral strip in the spiral stripping electrical wire 70. In case the rotating mold member 40 is made having two flow paths 42, the second insulative material 73 will form two spiral strips in the spiral stripping electrical wire 70. Therefore, the number of spiral strips in the spiral stripping electrical wire 70 is determined subject to the number of flow paths 42 in the rotating mold member 40.

Figure 5:
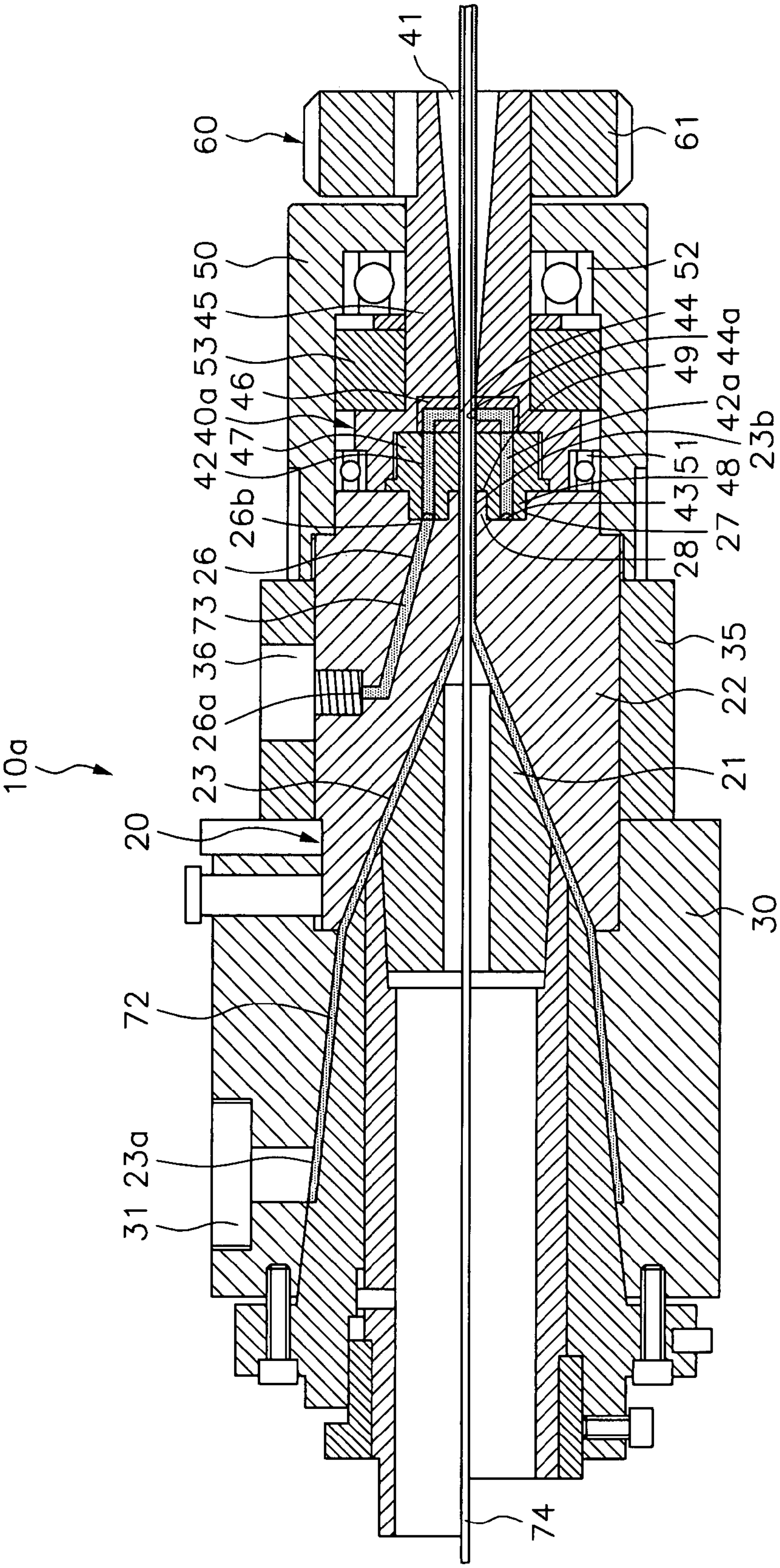
FIG. 5 is a sectional view in axial direction of an alternate form of the extrusion device for making spiral stripping electrical wires according to the present invention.

FIG. 5 illustrates an alternate form of the present invention. According to this embodiment, the rotating mold member 40*a* of the extrusion device 10*a* has a first flow path 42 and a second flow path 42*a* arranged in a symmetrical manner. The first flow path 42 and the second flow path 42*a* have a respective outlet 44 and 44*a* disposed in communication with the mold hole 41, and a common annular inlet 43 connected to the outlet 26*b* of the supplementary flow path 26. During extrusion, the fluid of the second insulative material 73 is forced through the two flow paths 42 and 42*a* of the rotating mold member 40*a* into the axially flowing fluid of the first insulative material 72, forming two symmetrical spiral strips in the first insulative material 72. Except the number of the flow paths in the rotating mold member, the other features of the aforesaid first embodiment retain in this second embodiment. Therefore, like reference numbers indicate like parts in FIGS. 3 and 5.

When extruding a double color electrical wire or cable according to the present invention, the second insulative material is rotating with the rotating mold member and forced into the first insulative material, forming at least one spiral strip in the first insulative material. Therefore, the invention greatly enhances the identification and visual sense of beauty of double color electrical wires and cables.

Although particular embodiments of the invention have been described in detail for purposes of illustration, various modifications and enhancements may be made without departing from the spirit and scope of the invention. Accordingly, the invention is not to be limited except as by the appended claims What the invention claimed is:

1. An extrusion device for making a spiral stripping electrical wire, comprising:

a fixed mold member, said fixed mold member comprising a main flow path and a supplementary flow path for the passing of a first insulative material and a second insulative material respectively, said main flow path and said supplementary flow path each having an inlet and an outlet; and a rotating mold member rotatably supported on a front end of said fixed mold member, said rotating mold member having a mold hole in communication and axial alignment with the outlet of said main flow path and at least one flow path, the at least one flow path of said rotating mold member each having an outlet in communication with said mold hole and an annular inlet disposed on a rear end of said rotating mold member in communication with the outlet of said supplementary flow path;

wherein said fixed mold member is comprised of an inner mold element and an outer mold element, said inner mold element having an outer surface, said outer mold element having an inner surface, the inner surface of said outer mold element and the outer surface of said inner mold element defining said main flow path; and wherein said rotating mold member has an annular protrusion protruded from a rear end thereof and defining a circular recess; said outer mold element of said fixed mold has an annular protrusion protruded from a front end thereof and inserted into the circular recess of said rotating mold member and an annular groove, which receives the annular protrusion of said rotating mold member.

2. The extrusion device as claimed in claim 1, wherein the number of the at least one flow path of said rotating mold member is at least 2, and the multiple flow paths of said rotating mold member are equiangularly spaced from one another and have one common annular inlet.

3. The extrusion device as claimed in claim 1, further comprising a socket connected to the front end of said fixed mold member, said socket comprising two axle bearings and an intermediate member mounted in between said axle bearings to support said rotating mold member.

4. The extrusion device as claimed in claim 3, wherein said socket is equipped with a heater means.

5. The extrusion device as claimed in claim 4, wherein said socket is fastened to said fixed mold member by a screw joint.

6. The extrusion device as claimed in claim 1, further comprising a transmission mechanism adapted to rotate said rotating mold member.

7. The extrusion device as claimed in claim 6, wherein said transmission mechanism comprises a speed changer.

8. The extrusion device as claimed in claim 1, further comprising a heating barrel sleeved onto the periphery of said fixed mold member.

9. The extrusion device as claimed in claim 8, wherein said heating barrel has a supplementary filling hole in communication with the inlet of said supplementary flow path of said fixed mold member.

* * * * *